(12) United States Patent
Tateno

(10) Patent No.: US 8,833,202 B2
(45) Date of Patent: Sep. 16, 2014

(54) DUAL CAMSHAFT STRUCTURE AND METHOD FOR ASSEMBLING DUAL CAMSHAFT STRUCTURE

(75) Inventor: Manabu Tateno, Sunto-gun (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 94 days.

(21) Appl. No.: 13/265,106

(22) PCT Filed: Dec. 28, 2010

(86) PCT No.: PCT/JP2010/073713
§ 371 (c)(1),
(2), (4) Date: Oct. 18, 2011

(87) PCT Pub. No.: WO2012/090300
PCT Pub. Date: Jul. 5, 2012

(65) Prior Publication Data
US 2012/0160055 A1    Jun. 28, 2012

(51) Int. Cl.
*F16H 53/00* (2006.01)

(52) U.S. Cl.
USPC .......................................................... 74/567

(58) Field of Classification Search
USPC ................................ 74/567; 123/90.17, 90.27
See application file for complete search history.

(56) References Cited

U.S. PATENT DOCUMENTS

| | | | |
|---|---|---|---|
| 7,069,892 B2* | 7/2006 | Lechner et al. | 123/90.6 |
| 7,958,859 B2* | 6/2011 | Methley et al. | 123/90.6 |
| 2006/0107913 A1 | 5/2006 | Lechner et al. | |
| 2007/0245990 A1 | 10/2007 | Hentschel et al. | |
| 2008/0257290 A1 | 10/2008 | Lettmann et al. | |
| 2009/0229551 A1* | 9/2009 | Clever et al. | 123/90.17 |
| 2010/0132640 A1 | 6/2010 | Methley et al. | |

FOREIGN PATENT DOCUMENTS

| | | | |
|---|---|---|---|
| DE | 10 2009 012 141 A1 | 10/2009 | |
| GB | 2 424 257 A | 9/2006 | |
| JP | 64-049610 U | 3/1989 | |
| JP | 2002-054410 A | 2/2002 | |
| JP | 2008-519215 A | 6/2008 | |
| JP | 2008-530412 A | 8/2008 | |
| JP | 2008-274962 A | 11/2008 | |
| JP | 2009-144521 A | 7/2009 | |
| WO | WO 2009005999 A1 * | 1/2009 | F01L 1/047 |

* cited by examiner

*Primary Examiner* — Vicky Johnson

(74) *Attorney, Agent, or Firm* — Sughrue Mion, PLLC

(57) ABSTRACT

In a dual camshaft structure, an inner shaft provided with a variable cam is inserted into an outer shaft provided with a secured cam. In the dual camshaft structure, the secured cam is provided on a first cylindrical member, the first cylindrical member is secured to the outside of the outer shaft, the variable cam is provided on the second cylindrical member, and the second cylindrical member is installed at the outside of the first cylindrical member and is secured to the inner shaft by a connection member via a notch provided on the first cylindrical member and a notch provided on the outer shaft. Therefore, the rigidity of the dual camshaft structure can be ensured, and a slidable surface of a cam rotatable at the outside of the outer shaft can be held.

5 Claims, 9 Drawing Sheets

DUAL CAMSHAFT STRUCTURE AND METHOD FOR ASSEMBLING DUAL CAMSHAFT STRUCTURE

CROSS REFERENCE TO RELATED APPLICATION

This application is a National Stage of International Application No. PCT/JP2010/073713 filed Dec. 28, 2010, the contents of all of which are incorporated herein by reference in their entirety.

TECHNICAL FIELD

The present invention relates to a dual camshaft structure and a method for assembling a dual camshaft structure.

BACKGROUND ART

Conventionally, there is known a camshaft equipped with plural cams relatively rotatable (for example, Patent Document 1). Specifically, at least one of the cams is supported by an outer shaft for relative rotation, and is secured to an inner shaft via a notch of the outer shaft. A secured cam is separately provided on the outer shaft. In this case, plural cams are fitted into a base pipe to form a single unit. This unit slides over an outer peripheral surface of the outer shaft.

Also, there is known an example where an intake cam secured to the inner shaft is composed of a cylindrical member slidably supported by a cam support portion as a bulging portion integrally formed on the outer shaft (for example, Patent Document 2).

PRIOR ART DOCUMENT

Patent Document

[Patent Document 1] Published Japanese translation of a PCT application No. 2008-530412.
[Patent Document 2] Japanese Patent Application Publication No. 2009-144521.

DISCLOSURE OF THE INVENTION

Problems to be Solved by the Invention

However, since the camshaft of Patent Document 1 is provided with the plural cams on the base pipe, it is difficult to sufficiently ensure the area for securing the cams to the inner shaft by pins. As a result, strong connection of the cams seems difficult. For example, in case of providing two cams in the base pipe, each of pins has to be arranged at a center of each of two cams in order for two cams to receive an equal force. For this reason, it might be difficult to sufficiently ensure the area for securing the pin. Moreover, since the pin for securing the base pipe to the inner shaft penetrates through the outer shaft, two notches for escaping the pins have to be formed on the outer shaft. This results in that the rigidity of the outer shaft reduces. In particular, the reduction in the torsional rigidity might cause a difference in the valve timings, and the reduction in the shaft flexural rigidity might make a noise from a valve operating system and a trouble with the opening operation of a Hydraulic Lash Adjuster. The outer shaft can be made thick in order to make up for the reduction in the rigidity caused by the provision of the notches. However, a cam bearing is made larger and weight saving is hindered. Also, when only the cam bearing of a movable cam is made thick, it is difficult to eliminate treatment processes. Further, it is difficult to use a cheap pipe material, thereby increasing the cost. Furthermore, since the plural cams are installed in the single base pipe to form a single unit, the cams which respectively effect on the different cylinders are included in the single unit. However, the difference in the valve timings of the adjacent cylinders is different depending on a type of the engine. Thus, different units have to be prepared according to the engine type. As a result, the cost is increased and it is difficult to employ the unit to another engine.

Also, in cases where the single base pipe is provided with the plural cams having different phases, the base pipe is subjected to plural movements of the cams at several times during one rotation of the outer shaft. For this reason, the improvement in fatigue limit of the pin is demanded.

Furthermore, in cases of the inner and outer dual camshaft structure, the pin is generally press-fitted, when the cam to be secured to the inner shaft is attached. At this time, it is supposed that the inner shaft is bent and the control of a clearance between the inner shaft and the outer shaft is difficult. Also, in the camshaft disclosed in Patent Document 1, it is also difficult to control the clearance between the outer shaft and the base pipe.

Further, the cam secured to the outer shaft and a cam being rotatable relative thereto are installed on the outer shaft. For this reason, the following problem is concerned. The cam secured to the outer shaft is formed into a cylindrical shape, and is secured by a frictional force between its inner surface and the outer peripheral surface of the outer shaft. Thus, when the cam is moved to a desired position, the outer peripheral surface of the outer shaft might become rough. Since this outer peripheral surface of the outer shaft is a slidable surface against the cam rotatable relative to the outer shaft, it is undesirable for the outer peripheral surface of the outer shaft to become rough.

Likewise, in the example disclosed in Patent Document 2, it is supposed that the outer peripheral surface of the outer shaft becomes rough when the cylindrical member is installed on the outer shaft. In particular, in cases where plural cylindrical members are installed and the cylindrical member to be installed at the back side passes through a portion where another cylindrical member installed at the front side, the outer peripheral surface of the portion seems to become rough. Like the example disclosed to Patent Document 1, it is difficult to control the clearance between the members slidable each other in the example disclosed in Patent Document 2.

It is thus an object of the present invention to provide a dual camshaft structure and a method for assembling the dual camshaft structure described herein, thereby ensuring a rigidity of the dual camshaft structure and holding a slidable surface of a cam that is secured to an inner shaft and is rotatable at the outside of an outer shaft.

Means for Solving the Problems

In order to resolve the above problem, a dual camshaft structure described herein, where an inner shaft provided with a variable cam is inserted into an outer shaft provided with a secured cam, characterized in that the secured cam is provided on a first cylindrical member, the first cylindrical member is secured to an outside of the outer shaft, the variable cam is provided on a second cylindrical member, and the second cylindrical member is rotatably installed at an outside of the first cylindrical member and is secured to the inner shaft by a connection member via a notch provided on the first cylindrical member and a notch provided on the outer shaft.

The first cylindrical member is secured to the outside of the outer shaft and rotates in accordance with the outer shaft. The first cylindrical member is secured to the outer peripheral surface of the outer shaft by press-fitting. The first cylindrical member is moved from one end side of the outer shaft to the desired position and is secured thereto. At this time, the outer peripheral surface of the outer shaft might become rough. The second cylindrical member is installed at the outside of the first cylindrical member. That is, the first cylindrical member provided with the secured cam and the second cylindrical member provided with the variable cam as a rotational cam are combined to form a single unit. The outer peripheral surface of the first cylindrical member is a slidable surface of the second cylindrical member. When the surface of this first cylindrical member is treated once, the first cylindrical member is not influenced by any treatments except for the attachment of the second cylindrical member making a pair. In such way, the slidable surface is held. That is, the slidable surface of the second cylindrical member is not influenced by the treatment for attaching the first cylindrical member to the outer shaft.

The dual camshaft structure described herein includes the first cylindrical member and the second cylindrical member overlapping the outer shaft. Thus, this makes the rigidity high. Specifically, the first cylindrical member overlaps a portion provided with the notch for rotating the second cylindrical member provided with the variable cam. This increases the rigidity.

Since the second cylindrical member has only to be equipped with a single cam, it is therefore easy to secure the space for attaching the connection member and it is possible to strengthen the connection between the second cylindrical member and the inner shaft by means of the connection member.

For example, the second cylindrical member can be provided with a press-fitted portion having a projection shape, the press-fitted portion being provided with an insertion hole into which the connection member is inserted. The press-fitted portion having the projection shape is provided, whereby the contact area between the second cylindrical member (the inner peripheral surface of the insertion hole) and the connection member is increased, and the frictional force is increased. This results in that the detachment of the connection is suppressed and the strong connection is achieved.

It is desirable such a press-fitted portion be provided in parallel with the variable cam. The press-fitted portion is formed to have the projection shape and in parallel with the variable cam formed with a cam nose, thereby improving the rigidity of the press-fitted portion. That is, the variable cam and the press-fitted portion can be formed as a continuous projection portion. Since the variable cam and the press-fitted portion is formed as a single portion, the area for press-fitting can be made large, while the rigidity of the press-fitted portion is ensured.

The connection member can include a step portion abutting the inner shaft. The provision of the step portion allows positioning of the connection portion. The connection portion is provided with the step portion, thereby facilitating the control of the clearance between the inner shaft and the outer shaft and the clearance between the first cylindrical member and the second cylindrical member.

A method, described herein, for assembling a dual camshaft structure in which an inner shaft is inserted into an outer shaft, a first cylindrical member provided with a secured cam is secured to an outside of the outer shaft, and a second cylindrical member provided with a variable cam is rotatably arranged at the outside of the outer shaft and is secured to the inner shaft by a connection member, the method characterized by including: temporarily abutting a step portion with the inner shaft, when the connection member provided with the step portion abutting the inner shaft is inserted to an insertion hole provided in the inner shaft via a notch provided on the first cylindrical member and a notch provided on the outer shaft; and moving the connection member in an opposite direction to an insertion direction to ensure a clearance between an outer peripheral surface of the first cylindrical member and an inner peripheral surface of the second cylindrical member.

This can control the clearance between the inner shaft and the outer shaft and the clearance between the first cylindrical member and the second cylindrical member. Further, the connection member is press-fitted such that the step portion thereof abuts the inner shaft once, thereby making the strong connection between the inner shaft and the connection member.

An adjustment hole is provided on each of the inner shaft, the outer shaft, the first cylindrical member, and the second cylindrical member so as to arrive at an end portion of the connection member inserted into the insertion hole of the inner shaft, and the connection member is pushed back via the adjustment holes, thereby moving the connection member in the opposite direction to the insertion direction by pushing the connection portion.

Effects of the Invention

According to the dual camshaft structure and the method for assembling the dual camshaft structure described herein, whereby the rigidity of the dual camshaft structure is ensured and a slidable surface of a cam rotatable at the outside of an inner shaft is held.

MODES FOR CARRYING OUT THE INVENTION

In the following, embodiments will be described with reference to the accompanying drawings. However, dimensions and ratios of components may be identified to those of real components. Further, details may be omitted in drawings.

Embodiment

Figure 1:
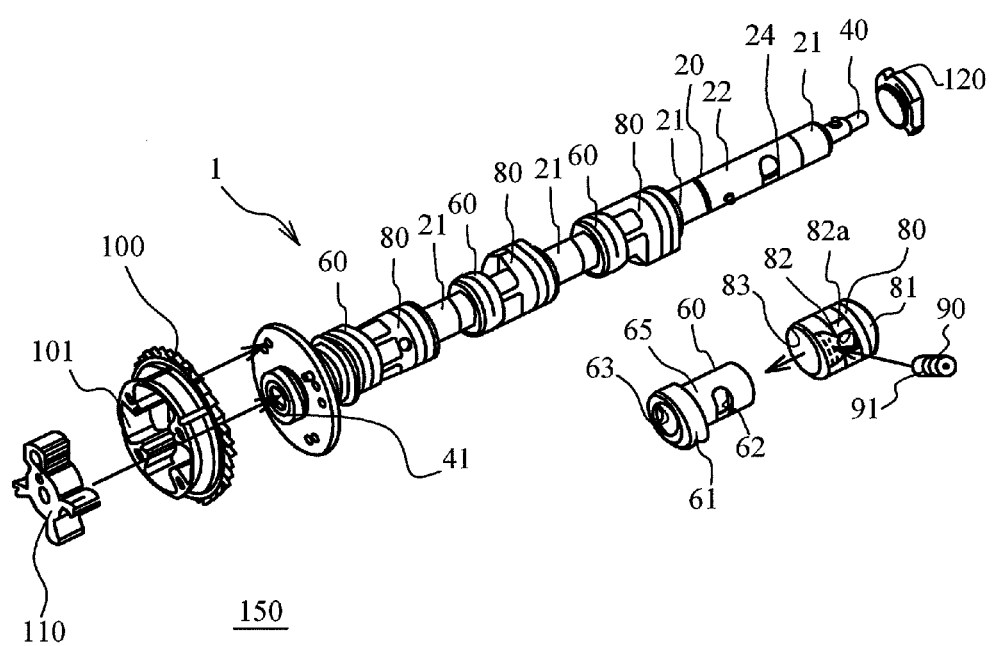
FIG. 1 is an explanatory view of a valve drive mechanism equipped with a dual camshaft structure according to an embodiment.
Figure 2:
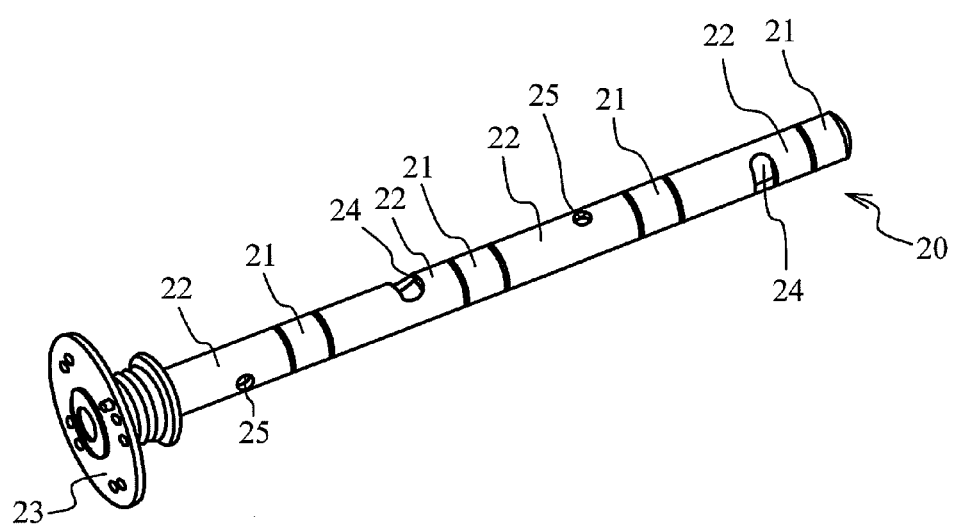
FIG. 2 is a perspective view of an outer shaft incorporated into the valve drive mechanism according to the embodiment.
Figure 3:
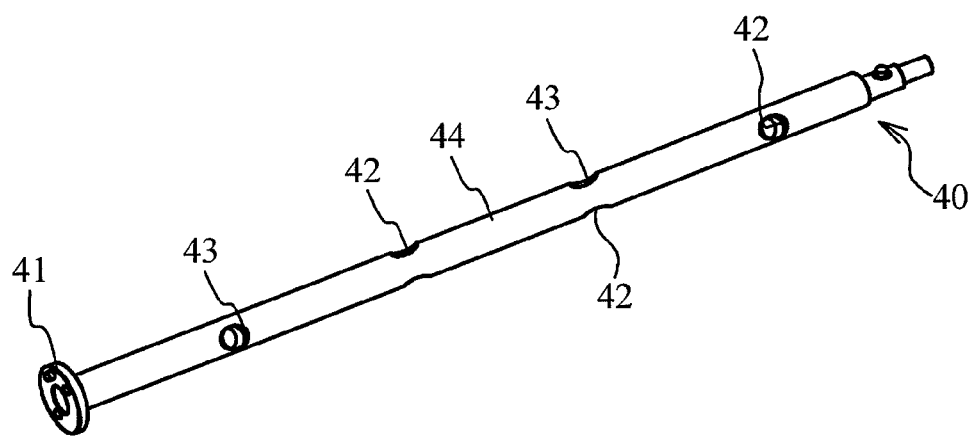
FIG. 3 is a perspective view of an inner shaft incorporated into the valve drive mechanism according to the embodiment.
Figure 4:
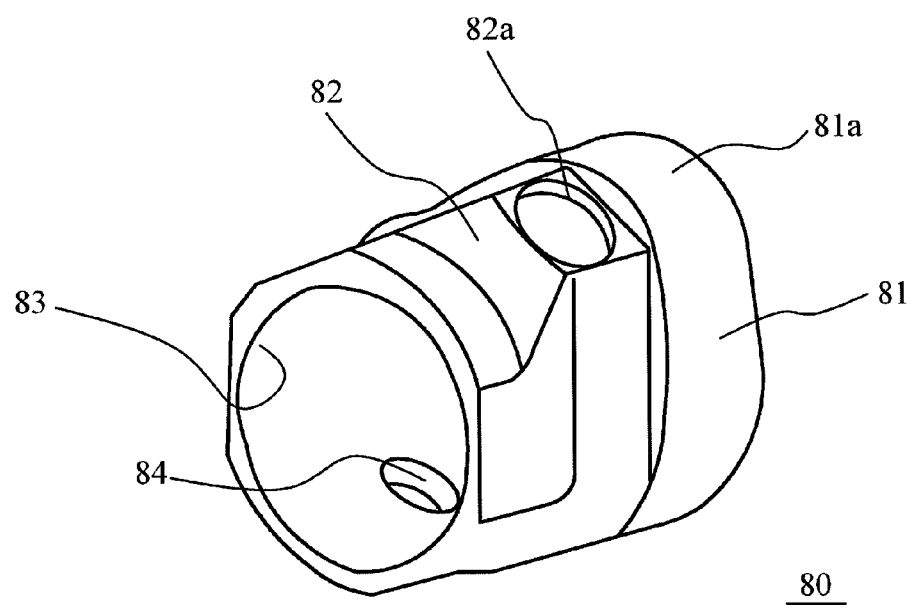
FIG. 4 is an enlarged perspective view of a second cylindrical member including the variable cam.
Figure 5:
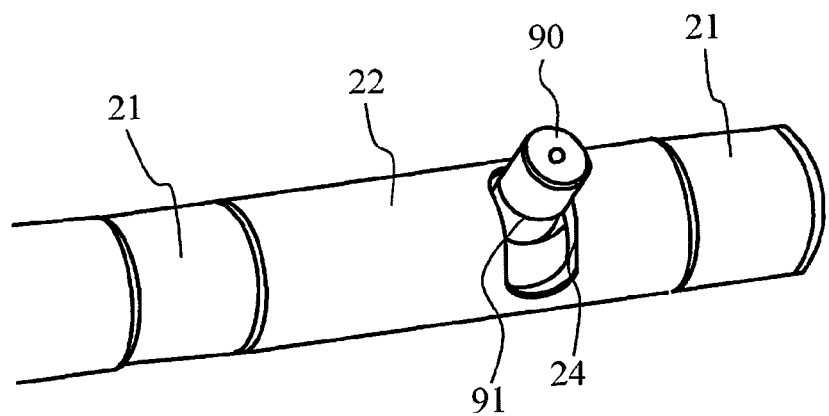
FIG. 5 is an explanatory view of a state where a first cylindrical member and the second cylindrical member are removed from the outer shaft.
Figure 6:
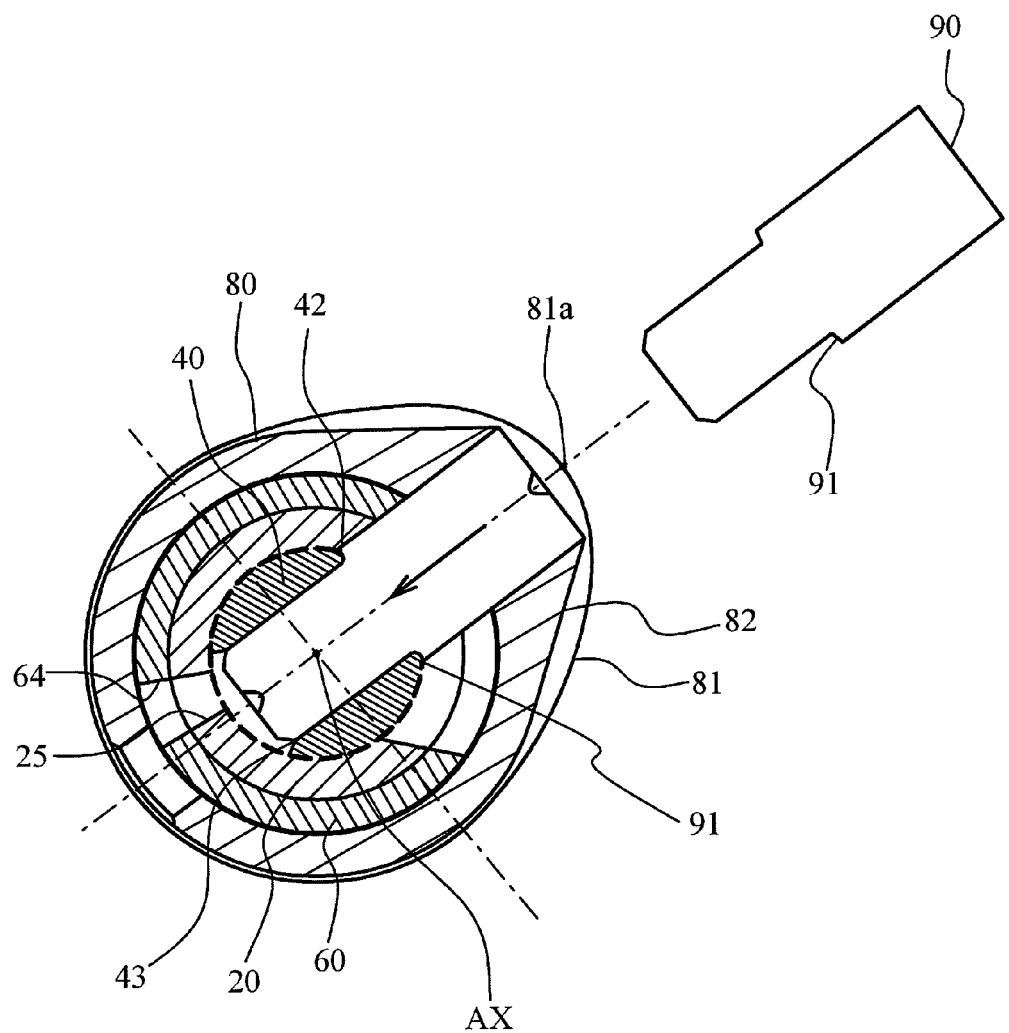
FIG. 6 is a sectional view of the dual camshaft structure according to the embodiment.
Figure 7A:
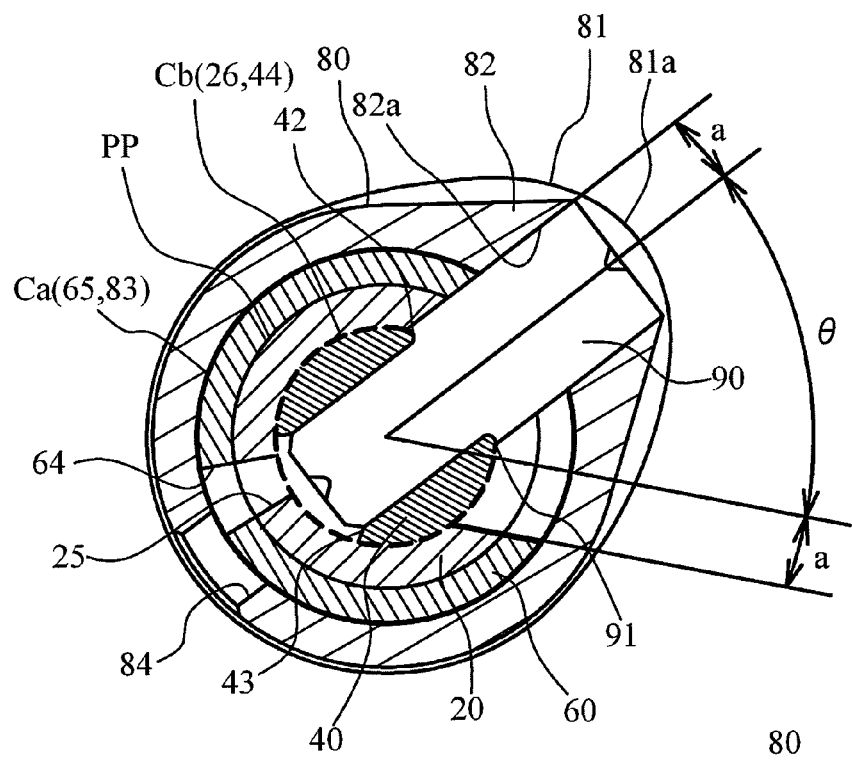
FIG. 7A is an explanatory view of a state where a connection member is inserted into the inner shaft.
Figure 7B:
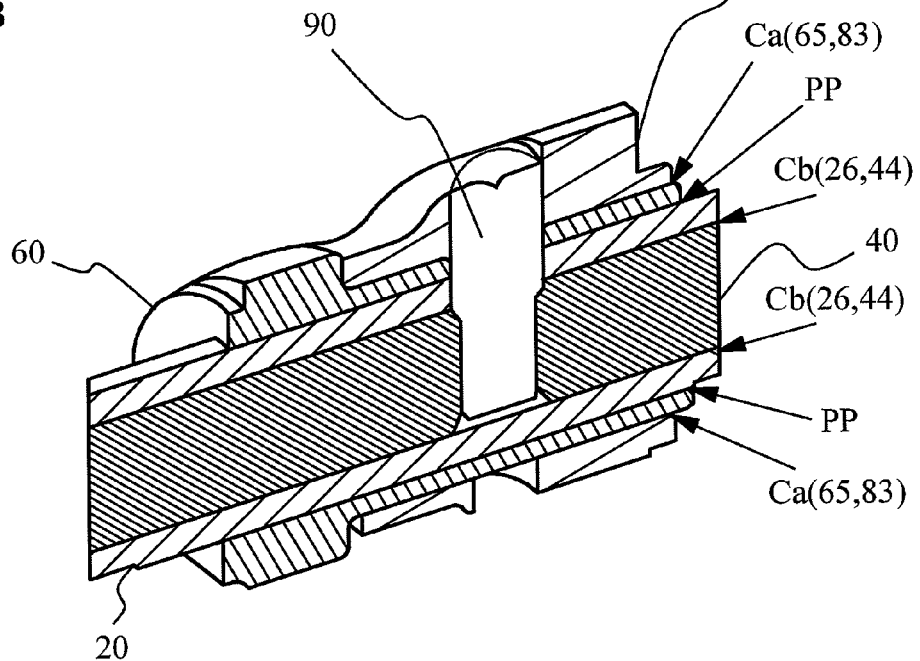
FIG. 7B is an explanatory view of a cross section, in an axial direction, of the dual camshaft structure according to the embodiment.

FIG. 1 is an explanatory view of a valve drive mechanism 150 partially disassembled and equipped with a dual camshaft structure according to an embodiment. FIG. 2 is a perspective view of an outer shaft 20 incorporated into the valve drive mechanism 150. FIG. 3 is a perspective view of an inner shaft 40 incorporated into the valve drive mechanism 150. FIG. 4 is an enlarged perspective view of a second cylindrical member 80 equipped with a variable cam 81. FIG. 5 is an explanatory view of a state where a first cylindrical member 60 and the second cylindrical member 80 are removed from the outer shaft 20. FIG. 6 is a sectional view of the dual camshaft structure 1 according to the embodiment. FIG. 7A is an explanatory view of a connection member 90 inserted into the inner shaft 40, and FIG. 7B is an explanatory view of a cross section, in an axial direction, of the dual camshaft structure 1 according to the embodiment.

The valve drive mechanism 150 is equipped with the dual camshaft structure 1. The valve drive mechanism 150 according to the present embodiment is used for four-cylinder internal combustion engines. The dual camshaft structure 1 is equipped with a structure where the inner shaft 40 provided with the variable cam 81 is installed into the outer shaft 20 provided with a secured cam 61. The secured cam 61 rotates in accordance with the rotation of the outer shaft 20. The variable cam 81 rotates in accordance with the rotation of the inner shaft 40. Since the inner shaft 40 rotates relative to the outer shaft 20, the phase of the variable cam 81 is changeable against the phase of the secured cam 61.

The outer shaft 20 is a pipe-shaped member as illustrated in FIGS. 1 and 2. The outer shaft 20 is equipped with journal portions 21 and secured portions 22 to which the first cylindrical member 60 is secured. Four journal portions 21 are provided. The journal portions 21 are supported by bearing portions of a cylinder head of the internal combustion engine. Also, four secured portions 22 are provided. The diameter of the journal portion 21 is slightly smaller than that of the secured portion 22 by machine abrasion. Also, the diameter of this journal portion 21 can be reduced by press drawing treatment. The outer shaft 20 is provided at its end with a flange portion 23. Another member is joined by, for example, friction welding to provide the flange portion 23. A variable valve timing (VVT) sprocket 100 is attached to this flange portion 23 as illustrated in FIG. 1. The VVT sprocket 100 is equipped with a vane accommodation portion 101.

As illustrated in FIG. 2, the outer shaft 20 is provided with notches 24 positionally corresponding to the secured portions 22. The notch 24 is provided through which the connection members 90 passes as illustrated in FIG. 5. The length of this notch 24 in the peripheral direction is set depending on the range of a change in the phase of the variable cam 81. One of the notches 24 has only to be provided at one of the secured portions 22. If the connection member 90 penetrates through the outer shaft 20, a pair of notches opening to the outer shaft 20 is needed. However, in the dual camshaft structure 1 according to the present embodiment, the connection member 90 does not penetrate through the outer shaft 20. It is therefore unnecessary to provide two notches opening to the outer shaft in the peripheral direction.

The outer shaft 20 is provided with adjustment holes 25 positionally corresponding to the secured portions 22 respectively. The adjustment hole 25 is used, when the connection member 90 is pushed back to control the clearance between each portion in assembling the dual camshaft structure 1.

As illustrated in FIGS. 1 and 3, the inner shaft 40 is a rod-shaped member. An outer peripheral surface 44 of the inner shaft 40 is a slidable surface against the internal peripheral surface of the outer shaft 20. The inner shaft 40 is equipped with a flange portion 41 at its end. For example, a rod-shaped member is treated by forging to form the flange portion 41. A vane 110 for the VVT is attached to the flange portion 41 as illustrated in FIG. 1. The vane 110 is accommodated in the vane accommodation portion 101 provided in the VVT sprocket 100. A cam sensor plate 120 is installed at the other end of the inner shaft 40 as illustrated in FIG. 1.

As illustrated in FIG. 2, the inner shaft 40 is provided with four insertion holes 42 for the connection member 90. The insertion hole 42 is a through-hole. An opening, which is provided at the opposite side to the insertion side of the insertion hole 42, is an adjustment opening 43. The adjustment openings 43 are used, when the connection member 90 is pushed back in order to control the clearance between each portion in assembling the dual camshaft structure 1. That is, the insertion holes 42 are also used as adjustment holes.

As illustrated in FIG. 1, the secured cam 61 is provided in the first cylindrical member 60. The first cylindrical member 60 is equipped with a notch 62. The notch 62 is provided through which the connection member 90, as will be described later, passes. The first cylindrical member 60 is secured to the outside of the outer shaft 20 as illustrated in FIG. 6. Specifically, the first cylindrical member 60 is secured on the outer peripheral surface of the outer shaft 20 by press-fitting. Before press-fitting, the diameter of the inner peripheral surface 63 of the first cylindrical member 60 is slightly smaller than the outer diameter of the secured portion 22 of the outer shaft 20. By press-fitting, the first cylindrical member 60 is expanded to some extent, and then secured with its binding force. The first cylindrical member 60 moves to the predetermined secured portion 22 over the outer shaft 20. However, the diameter of the journal portion 21 is slightly small. Therefore, this avoids the journal portion 21 from being scratched by the movement of the first cylindrical member 60. At the time of the accomplishment of the press-fitting, the position of the notch 62 provided on the first cylindrical member 60 is identical to the position of the notch 24 provided on the outer shaft 20. The first cylindrical member 60 is arranged to overlap the periphery of the notch 24, thereby reinforcing this position of the outer shaft 20. Although the provision of the notch 24 on the outer shaft 20 might reduce the rigidity therearound, the first cylindrical member 60 can supplement the reduction in rigidity. This can ensure the necessary rigidity, without enlarging the whole diameter of the outer shaft in order to remain the rigidity of the outer shaft 20.

The first cylindrical member 60 is equipped with an adjustment hole 64 as illustrated in FIG. 6. The adjustment hole 64 is used, when the connection member 90 is pushed back in order to control the clearance between each portion in assembling the dual camshaft structure 1. An outer peripheral surface 65 of the first cylindrical member 60 is a slidable surface against an inner peripheral surface 83 of the second cylindrical member 80, as will be described later.

The variable cam 81 is provided on the second cylindrical member 80 as specifically illustrated in FIG. 4. This second cylindrical member 80 is rotatably installed at the outside of the first cylindrical member 60 as illustrated in FIGS. 1, 6, 7A, and 7B. Also, the second cylindrical member 80 is secured to the inner shaft 40 by the pin-shaped connection member 90 via the notch 62 provided on the first cylindrical member 60 and the notch 24 provided on the outer shaft 20. The second cylindrical member 80 is equipped with a press-fitted portion 82 which has a projection shape and which is provided with an insertion hole 82a into which the connection member 90 is inserted. The press-fitted portion 82 projects in the same direction to which a cam nose 81a of the variable cam 81 projects. Also, the press-fitted portion 82 is provided in parallel with the variable cam 81. The direction into which the connection member 90 is inserted is arranged at an axial line connecting an end of the cam nose 81a of the variable cam 81 with the rotational center AX thereof. This increases the contact area between the inner peripheral surface of the insertion hole 82a and the connection member 90, and increases the frictional force. As a result, the detachment of the connection member is suppressed, and then the strong connection is achieved.

The rigidity is improved by providing the press-fitted portion 82 in parallel with the variable cam 81. The variable cam 81 and the press-fitted portion 82 are formed as the single portion, whereby the space for press-fitting is increased while the rigidity of the press-fitted portion 82 is ensured.

The second cylindrical member 80 is equipped with the inner peripheral surface 83 as illustrated in FIG. 4. This inner peripheral surface 83 is a slidable surface against the outer peripheral surface 65 of the first cylindrical member 60. Herein, the outer peripheral surface 65 of the first cylindrical member 60 is polished as the slidable surface, and is not influenced by another treatment. For example, it is concerned that the outer peripheral surface of the outer shaft 20 is scratched to some degree when the first cylindrical member 60 is attached thereto. In contrast, a surface roughness, a shaft diameter, a shape, and the like suitable for the slidable surface are remained with accuracy, while the outer peripheral surface 65 of the first cylindrical member 60 is not influenced by such a treatment. Consequently, the second cylindrical member 80 can smoothly rotate relative to the first cylindrical member 60.

As illustrated in FIG. 4, the second cylindrical member 80 is equipped with an adjustment hole 84. The adjustment hole 84 is used when the connection member 90 is pushed back in order to control the clearance of each part in assembling the dual camshaft structure 1.

In this way, the first cylindrical member 60 and the second cylindrical member 80 are formed to be a single unit. The first cylindrical member 60 is equipped with the secured surface for the outer shaft 20 and a rotation slidable surface of the second cylindrical member 80, in particular, the variable cam 81.

Herein, the relationship between each member will be clearly described with reference to FIGS. 7A and 7B. The outer peripheral surface of the outer shaft 20 and the inner peripheral surface of the first cylindrical member 60 are represented by the press-fitted surface PP. The outer peripheral surface 65 of the first cylindrical member 60 and the inner peripheral surface 83 of the second cylindrical member 80 are the slidable surfaces, and the clearance therebetween is represented by Ca. The inner peripheral surface 26 of the outer shaft 20 and the outer peripheral surface 44 of the inner shaft 40 are the slidable surfaces, and the clearance therebetween is represented by Cb. In this manner, the press-fitted surface PP and the slidable surfaces are separated from each other in the dual camshaft structure 1 according to the present embodiment.

The features of the dual camshaft structure 1 according to the present embodiment will be summarized as follows.

To ensure a strong connection of the connection member 90, it seems to cause the connection member 90 to penetrate through the outer shaft 20 and support the connection member 90 at both sides of the second cylindrical member 80. However, two notches have to be provided on the outer shaft 20 in order to cause the connection member 90 to penetrate through the outer shaft 20. The increase in the number of notches reduces the rigidity of the outer shaft 20. For example, if the difference in phase is increased and the timing when an intake valve is closed is delayed so as to achieve a high expansion ratio, the notch is made long in the peripheral direction. For this reason, it is desirable to make the notch at one position and the connection member 90 does not penetrate through the outer shaft 20. In the dual camshaft structure 1, the frictional force between the connection member 90 and the second cylindrical member 80 is improved, and the connection member 90 is held at one side of the second cylindrical member 80.

In this way, the connection member 90 is held at one side of the second cylindrical member 80 and does not penetrate through the outer shaft 20. Therefore, the outer shaft 20 is provided with the notch 24 at its only one side. Consequently, the rigidity of the outer shaft 20 is maintained, the length of the notch can be elongated in order to achieve the large change in phase.

Further, the first cylindrical member 60 is secured around the notch 24. The first cylindrical member 60 reinforces the portion of the outer shaft 20. This point is also an advantage in that the rigidity of the outer shaft 20 is ensured.

Additionally, the connection member 90 does not penetrate through the outer shaft 20. Thus, the connection member 90 is provided with a step portion 91 abutting the opening of the insertion hole 42 of the inner shaft 40 such that the connection member 90 does not abut the outer shaft 20. The step portion 91 has a function of adjusting the position of the connection member 90 to prevent the connection member 90 from being deeply inserted into the insertion hole 42 excessively and from projecting to the opposite side.

Next, a method for assembling the dual camshaft structure 1 will be described with reference to FIGS. 8A and 8B. Firstly, the inner shaft 40 is inserted into the outer shaft 20. Also, the first cylindrical member 60 provided with the secured cam 61 is secured to the outside of the outer shaft 20. The second cylindrical member 80 provided with the variable cam 81 is rotatably arranged on the outside of the first cylindrical member 60. The order of the above described processes doesn't matter. For example, the first cylindrical member 60 and the second cylindrical member 80 are combined to form a unit, and then this is secured to the outer shaft 20. Alternatively, the first cylindrical member 60 is secured to the outer shaft 20, and then the second cylindrical member 80 is rotatably arranged on the first cylindrical member 60. The timing when the inner shaft 40 is inserted into the outer shaft 20 doesn't matter.

The dimension of each part is controlled such that the relationship between the clearance Ca and the clearance Cb satisfies CaCb. Herein, the clearance Cb is allowed to be larger than the clearance Ca, but its allowable range is a range where the necessary displacement of an axis is allowed.

Figure 8A:
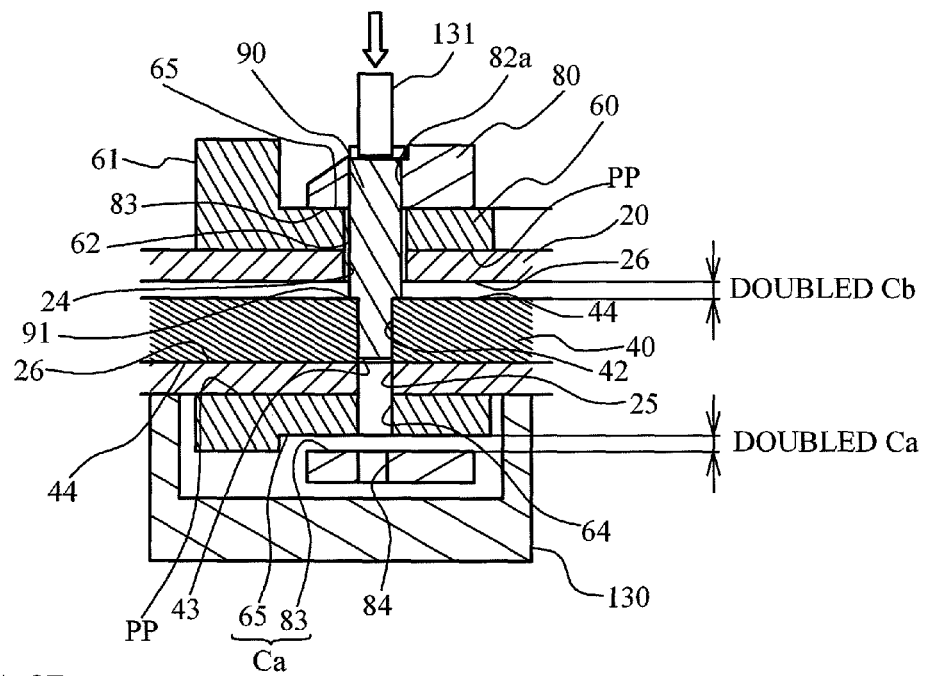
FIG. 8A is an explanatory view of schematically illustrating a process for inserting the connection member.

Under the condition that the outer shaft 20, the inner shaft 40, the first cylindrical member 60, and the second cylindrical member 80 are combined, these are arranged on a support jig 130 as illustrated in FIG. 8A. The support jig 130 is caused to abut the outer shaft 20. The outer shaft 20 is supported on the support jig 130, and then the connection member 90 is inserted into the insertion hole 82a of the second cylindrical member 80 and the insertion hole 42 of the inner shaft 40 by use of a press-fitting jig 131. At this time, the connection member 90 passes through the notch 24 provided on the outer shaft 20 and the notch 62 provided on the first cylindrical member 60. Then, the connection member 90 is pushed until the step portion 91 abuts the inner shaft 40. Then, the connection member 90 is further pushed, so the second cylindrical member 80 abuts the first cylindrical member 60 as illustrated in FIG. 8A, and subsequently the inner shaft 40 abuts the outer shaft 20. Then, the connection member 90 is pushed to such an extent that the inner shaft 40 is elastically deformed.

Therefore, the clearance of each part has twice the finally demanded clearance as illustrated in FIG. 8A.

Figure 8B:
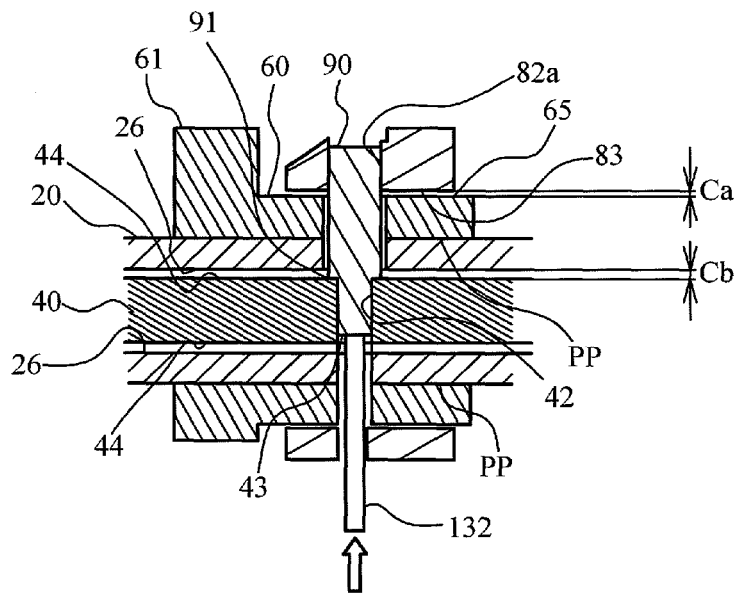
FIG. 8B is an explanatory view of schematically illustrating a process for adjusting a clearance between the inner shaft and the outer shaft and a clearance between the first cylindrical member and the second cylindrical member while the connection member is being pushed back.

Next, the connection member 90 is moved in the opposite direction to the insertion direction as illustrated in FIG. 8B. Specifically, a push-back jig 132 is caused to arrive at the end portion of the connection member 90 via the insertion hole 42 of the inner shaft 40, the adjustment hole 25 of the outer shaft 20, the adjustment hole 64 of the first cylindrical member 60, and the adjustment hole 84 of the second cylindrical member 80. Then, the push-back jig 132 is moved by the clearance Ca finally demanded. The connection member 90 is moved in such a manner, whereby the inner shaft 40 and the second cylindrical member 80 connected to the connection member 90 by the frictional force are pushed back.

Consequently, the clearance Ca is ensured, and the clearance Cb is controlled to the same extent of the clearance Ca.

Next, another method for assembling the dual camshaft structure 1 will be described with reference to FIGS. 9A and 9B. In an example illustrated in FIGS. 9A and 9B, firstly, the clearance Ca is determined by a securing jig 135. The securing jig 135 includes: a first abutment portion 135a abutting the outer peripheral surface of the second cylindrical member 80; and a second abutment portion 135b abutting the outer peripheral surface of the outer shaft 20. The outer shaft 20 and the second cylindrical member 80 are secured in such a manner as to be sandwiched from their both sides by such a securing jig 135. The securing jig 135 is treated with accuracy, whereby the positional relationship between the outer shaft 20 and the second cylindrical member 80 remains constant.

Figure 9A:
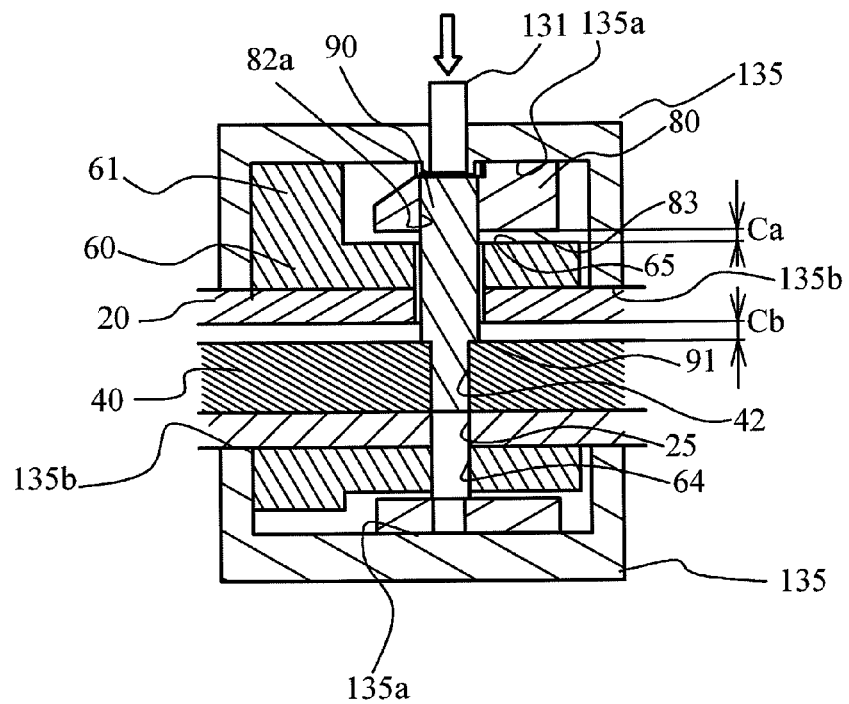
FIG. 9A is an explanation of schematically illustrating a process for inserting the connection while the clearance between the first cylindrical member and the second cylindrical member is ensured by a jig.

As illustrated in FIG. 9A, the connection member 90 is press-fitted into the insertion hole 82a provided on the second cylindrical member 80 and the insertion hole 42 provided on the inner shaft 40 by the press-fitted jig 131, while the outer shaft 20 and the second cylindrical member 80 are secured by the securing jig 135. The connection member 90 is pushed until the step portion 91 abuts the inner shaft 40. The connection member 90 is further pushed from this state so that the inner shaft 40 abuts the outer shaft 20 in the elastic deformation. At this time, the second cylindrical member 80 is secured to the secured jig 135, thereby maintaining the clearance Ca.

Figure 9B:
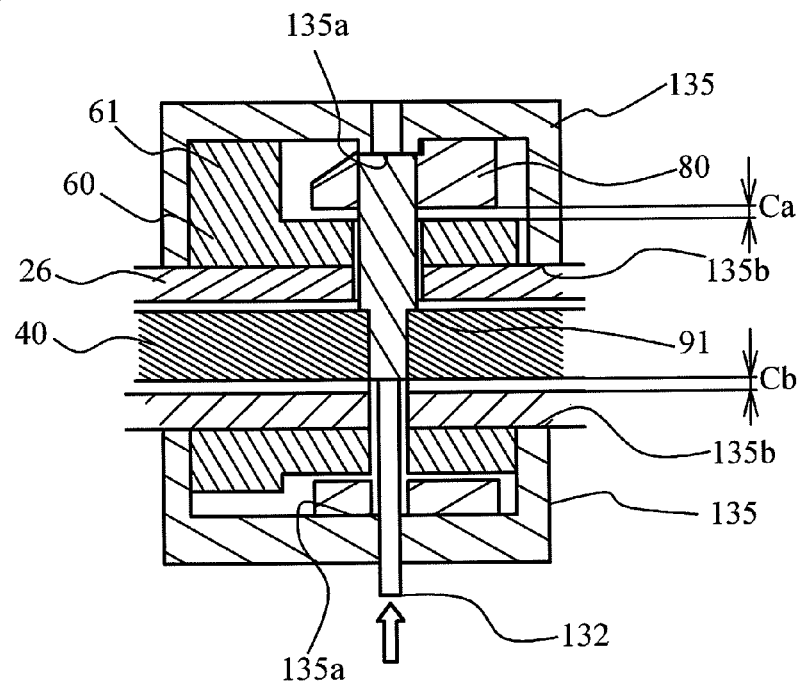
FIG. 9B is an explanatory view of schematically illustrating a process for adjusting the clearance between the inner shaft and the outer shaft while the connection member is being pushed back.

From this state, the connection member 90 is moved in the opposite direction to the insertion direction as illustrated in FIG. 9B. Specifically, the push-back jig 132 is caused to arrive at the connection member 90 through the insertion hole 42 of the inner shaft 40, the adjustment hole 25 of the outer shaft 20, the adjustment hole 64 of the first cylindrical member 60, and an adjustment hole 814 of the second cylindrical member 80. Then, the push-back jig 132 is moved by the clearance Cb finally demanded. The connection member 90 is moved in such a way, whereby the inner shaft 40 connected to the connection member 90 by a frictional force is pushed back. This ensures the clearance Cb.

As mentioned above, the clearance Ca and the clearance Cb are controlled.

While the exemplary embodiments of the present invention have been illustrated in detail, the present invention is not limited to the above-mentioned embodiments, and other embodiments, variations and modifications may be made without departing from the scope of the present invention.

The invention claimed is:

1. A dual camshaft structure, where an inner shaft provided with a variable cam is inserted into an outer shaft provided with a secured cam, wherein:
    the secured cam is provided on a first cylindrical member;
    the first cylindrical member is secured to an outside of the outer shaft;
    the variable cam is provided on a second cylindrical member; and
    the second cylindrical member is rotatably installed at an outside of the first cylindrical member, so as to form a single unit, and is secured to the inner shaft by a connection member via a notch provided on the first cylindrical member and a notch provided on the outer shaft,
    wherein the single unit includes the first cylindrical member and the second cylindrical member, and the first cylindrical member is a single member,
    wherein the second cylindrical member is provided with a press-fitted portion which has a projection shape with an insertion hole into which the connection member is inserted, and the press-fitted portion is located directly adjacent to the variable cam along an axial direction of the outer shaft.

2. The dual camshaft structure of claim 1, wherein the press-fitted portion is provided in parallel with the variable cam.

3. The dual camshaft structure of claim 1, wherein the connection member is provided with a step portion abutting the inner shaft.

4. The dual camshaft structure of claim 1, wherein the variable cam and the press-fitted portion are integrally formed as a single portion.

5. The dual camshaft structure of claim 1, wherein the insertion hole extends to an exterior side of the projection shape of the second cylindrical member, so as to be configured to allow the connection member to be inserted from outside the second cylindrical member in a direction toward the inner shaft.

* * * * *